(12) United States Patent
Sakai et al.

(10) Patent No.: US 8,063,324 B2
(45) Date of Patent: Nov. 22, 2011

(54) PADDLE SWITCH AND STEERING WHEEL

(75) Inventors: Naohiro Sakai, Saitama (JP); Yoshitaka Noguchi, Saitama (JP)

(73) Assignee: Toyo Denso Kabushiki Kaisha, Tokyo (JP)

( * ) Notice: Subject to any disclaimer, the term of this patent is extended or adjusted under 35 U.S.C. 154(b) by 274 days.

(21) Appl. No.: 12/318,089

(22) Filed: Dec. 22, 2008

(65) Prior Publication Data

US 2009/0165592 A1    Jul. 2, 2009

(30) Foreign Application Priority Data

Dec. 30, 2007   (JP) ................. 2007-341575

(51) Int. Cl.
*H01H 9/00*    (2006.01)
(52) U.S. Cl. .................. 200/313; 200/61.54
(58) Field of Classification Search .......... 200/310–315, 200/61.54, 61.85, 61.88, 61.27

See application file for complete search history.

(56) References Cited

U.S. PATENT DOCUMENTS

| | | | | |
|---|---|---|---|---|
| 4,013,855 A * | 3/1977 | Reichen et al. | ............... | 200/314 |
| 6,525,283 B2 * | 2/2003 | Leng | ............................. | 200/339 |
| 7,038,586 B2 * | 5/2006 | Wechsler | ................... | 200/61.54 |
| 2006/0283697 A1 * | 12/2006 | Garfio | ........................... | 200/310 |

FOREIGN PATENT DOCUMENTS

| | | |
|---|---|---|
| JP | 2004-349209 | 12/2004 |
| JP | 2005-008125 | 1/2005 |

\* cited by examiner

*Primary Examiner* — Felix O Figueroa

(74) *Attorney, Agent, or Firm* — Jean C. Edwards, Esq.; Edwards Neils PLLC

(57) ABSTRACT

Paddle levers protrude from lower sides of a center pad of a steering wheel into two lower spaces partitioned using a horizontal spoke and a vertical spoke of the steering wheel. The paddle lever is formed of a transparent photoconductor, and a periphery of the paddle lever is illuminated in a rimmed shape. Hence, the paddle lever can be visually recognized easily, and a finger touching the paddle lever can be visually recognized instantaneously. Therefore, operation almost nearly equivalent to complete blind touch operation can be attained, and the operability is improved.

8 Claims, 8 Drawing Sheets

PADDLE SWITCH AND STEERING WHEEL

The present application claims priority from Japanese Patent Application No. 2007-341575, filed Dec. 30, 2007, the content of which is herein incorporated by reference in its entirety.

FIELD OF THE INVENTION

The present disclosure relates to a paddle switch provided on a center pad of a steering wheel. More particularly, the present disclosure relates to a paddle switch which is ON/OFF operated by pulling up an operation knob of the paddle switch with a fingertip.

DESCRIPTION OF RELATED ART

Various paddle switches for steering wheels are known. A related-art shows that an oblong center pad is provided at the center of a steering wheel, paddle switches are provided on left and right sides of the center pad, and operation knobs of the paddle switches are provided between the center pad and a left grip section of the wheel section and between the center pad and a right grip section of the wheel section, wherein the operation knob of each paddle switch is pulled up with a fingertip while gripping the wheel section with a hand (refer to Patent document 1; Japanese Patent Application Laid-Open Publication No. 2005-8125).

In addition, another related-art shows that an operation lever of a paddle switch is provided with a photoconductor (refer to Patent document 2; Japanese Patent Application Laid-Open Publication No. 2004-349209).

According to Patent document 1, the operation knobs are made transparent so that a fingertip can be seen. However, since one operation knob has a plurality of operation sections, it is necessary to move a line of sight to the operation knobs each time operation is performed. It is thus desirable that such movement of the line of sight should be restrained and that the operation should be performed by blind touch as much as possible during driving. Furthermore, since a part of the operation knob is transparent, the operation knob has complicated structure.

According to Patent document 1, the operation knobs are made transparent so that a fingertip can be seen. However, since one operation knob has a plurality of operation sections, it is necessary to move a line of sight to the operation knobs each time operation is performed. It is thus desirable that such movement of the line of sight should be restrained and that the operation should be performed by blind touch as much as possible during driving. Furthermore, since a part of the operation knob is transparent, the operation knob has a complicated structure.

SUMMARY OF INVENTION

The invention provides a paddle switch with a simple structure and being able to attain operation nearly equivalent to complete blind touch operation.

According to a first aspect of the invention, a paddle switch for a steering wheel, the paddle switch protruding from a lower portion of a center pad provided on a center of the steering wheel is provided with an operation knob formed of a transparent photoconductor, wherein an outer periphery of the operation knob is illuminated depending on an ON/OFF operation of the paddle switch.

According to a second aspect of the invention, a reflecting surface may be formed on an operation part of the outer periphery of the operation knob.

According to a third aspect of the invention, the operation part of the outer periphery of the operation knob may be chamfered.

According to a fourth aspect of the invention, the reflecting surface of the operation knob may be inclined with respect to emitting direction of a light from a light source.

According to a fifth aspect of the invention, a light source may be a multicolor LED, and the outer periphery of the operation knob may be illuminated with different colors depending on the ON/OFF operation of the paddle switch.

According to a sixth aspect of the invention, a steering wheel is provided with a paddle switch according to the invention, a wheel section, a center pad provided on a center of the steering wheel and a horizontal spoke extending from the center pad in a radial direction, wherein the paddle switch is installed in the center pad, the operation knob of the paddle switch protrudes toward a lower space formed between the horizontal spoke and the wheel section and is positioned within the reach of a finger in a state of gripping a lower half side of the wheel section with a hand.

Other aspects and advantages of the invention will be apparent from the following description, the drawings and the claims.

DETAILED DESCRIPTION OF THE PREFERRED EMBODIMENT

Figure 1:
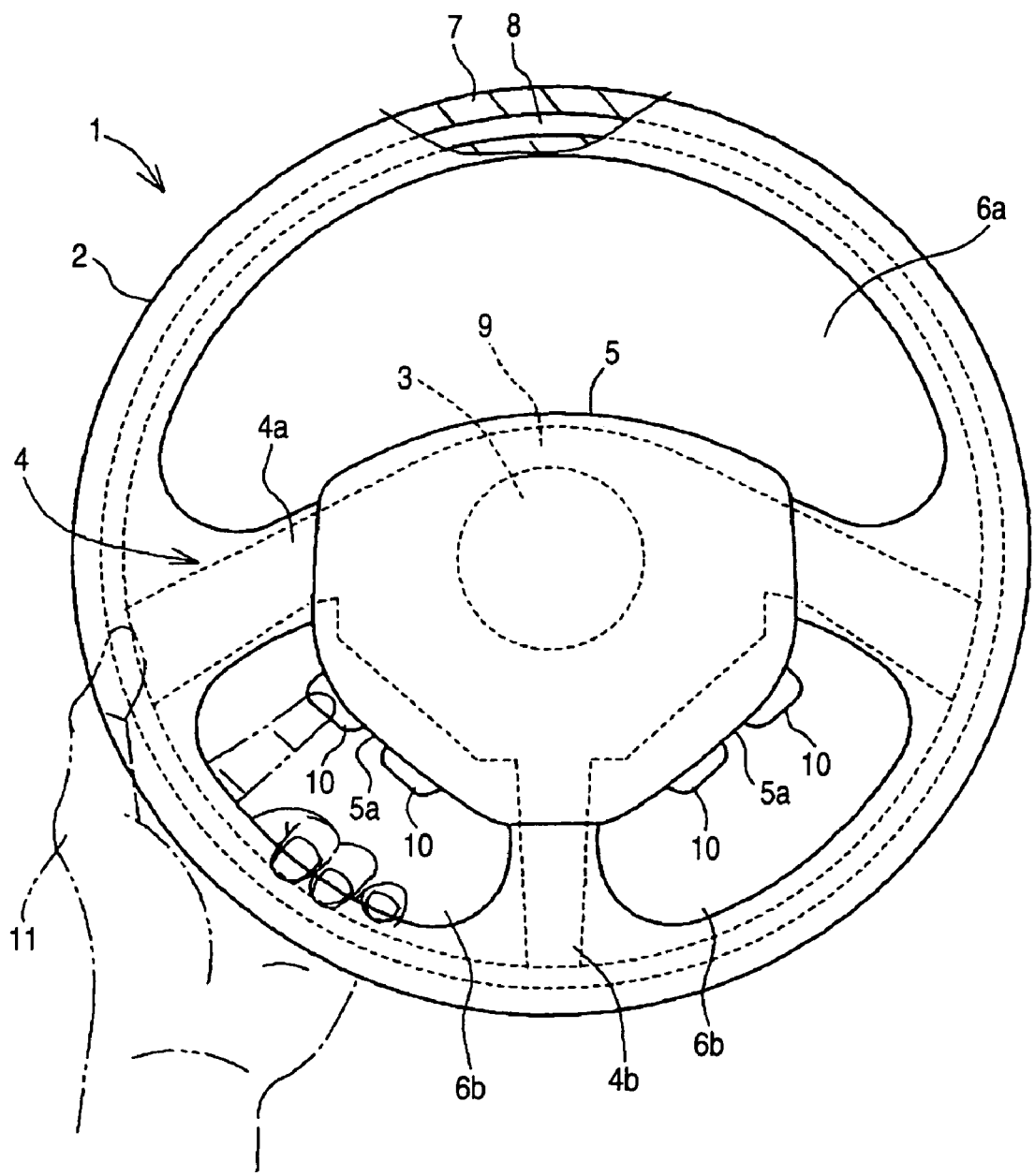
FIG. 1 is a front view showing a steering wheel.
Figure 2:
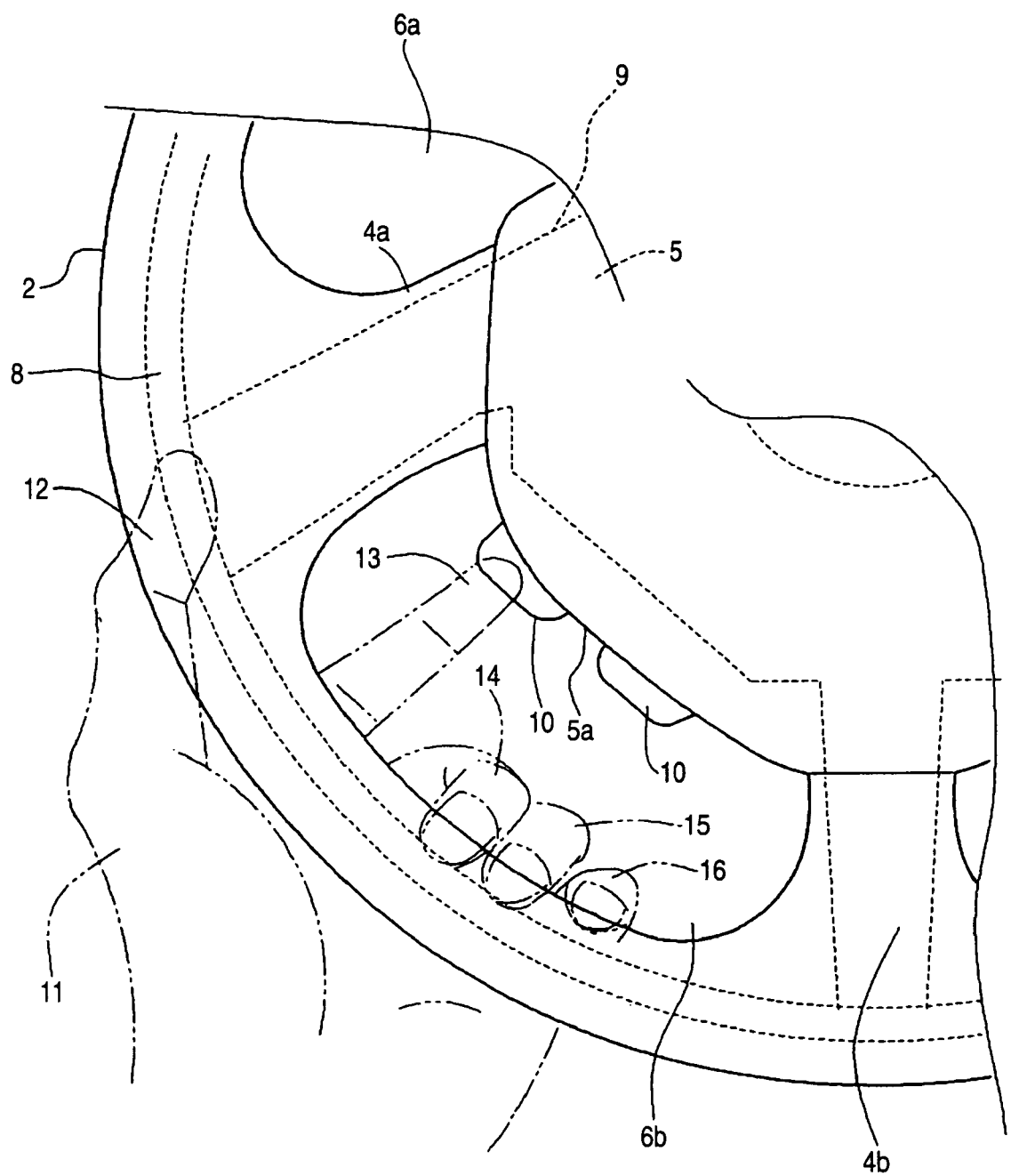
FIG. 2 is a magnified view showing a part of a paddle switch shown in FIG. 1.

An embodiment according to the present invention will be described below on the basis of the drawings. FIG. 1 is a front view showing a front side of a steering wheel 1. FIG. 2 is a magnified view showing a part of a paddle switch. The steering wheel 1 has a ring-shaped wheel section 2 and a spoke section 4. The spoke section 4 connects the wheel section 2 to a center boss 3. The center boss 3 is disposed at the center of the steering wheel 1 and connected to an upper end section of a steering shaft (not shown). The spoke section 4 has a horizontal spoke 4a extending in the nearly left-right direction and a vertical spoke 4b extending in the up-down direction on a central lower half side of the steering wheel 1. The central sides of the horizontal spoke 4a and the vertical spoke 4b are covered with a center pad 5.

The center pad 5 is a decorative member made of a resin and covering the central side of the spoke section 4. The center pad 5 has a nearly pentagonal shape in the embodiment. A space between the wheel section 2 and the center pad 5 are parted up and down by the spoke section 4. A semicircular upper space 6a is enclosed with the wheel section 2 and an upper side of the horizontal spoke 4a. Lower spaces 6b are formed on a lower side of the horizontal spoke 4a and parted left and right by the vertical spoke 4b.

The wheel section 2 and outer portions of the spoke section 4 outside the center pad 5 are integrally covered with an outer skin 7 made of a soft foamed resin or the like. The outer skin 7 of the wheel section 2 is formed around a core bar 8 made of a steel ring or the like. The outer skin 7 of the spoke section 4 is integrally formed on a spoke core metal sheet 9 composed of a steel sheet. A central portion of the spoke section 4 is not covered with the outer skin 7 so that the spoke core metal sheet 9 is exposed.

Multiple paddle levers 10 protrude into left and right lower spaces 6b from a pair of left and right lower sides 5a of the center pad 5. The paddle levers 10 are provided on the lower half side of the steering wheel 1 and positioned against a back face of an instrument panel (not shown) as viewed from a driver during the running operation of a vehicle. Furthermore, the paddle levers 10 are positioned within the reach of a finger while gripping the lower half side of the wheel section 2 with a hand.

The paddle levers 10 serve as operation knobs used for each of the multiple paddle switches described later. A clearance is provided between the adjacent paddle levers 10 so that the paddle levers 10 can be operated independently of each other. A paddle switch (described later) is switched ON/OFF by pulling up the paddle lever 10 with an index finger 13, etc., of a hand 11 gripping the wheel section 2. In FIG. 2, the hand 11 has a thumb 12, the index finger 13, a middle finger 14, a third finger 15 and a little finger 16. The paddle lever 10 can be operated using any of the fingers of the hand 11 gripping a nearly quarter of the circumference of the wheel section 2 ranging from the horizontal spoke 4a to the vertical spoke 4b on the lower half side of the wheel section 2. At this time, the hand 11 can contact with both or either one of the base section between the horizontal spoke 4a and the wheel section 2 and the base section between the vertical spoke 4b and the wheel section 2. Hence, the hand 11 can be positioned with respect to the paddle lever 10.

When the hand 11 grips a portion of the wheel section 2 facing the space 6b, the thumb 12 presses the upper face of the wheel section 2 from above and is positioned in the proximity of the base section of the horizontal spoke 4a. The index finger 13 to the little finger 16 are used to grip the wheel section 2 in the range between the horizontal spoke 4a and the vertical spoke 4b such that the tip ends of the fingers stick out from the lower side of the wheel section 2. When operating the paddle lever 10 (operation knob), a finger nearest to the paddle lever 10 operates the paddle lever 10. In the embodiment, it is assumed that the index finger 13 passes under the wheel section 2 and pushes the rear face of the paddle lever 10. That is, the index finger 13 operates the paddle lever 10.

Figure 3:
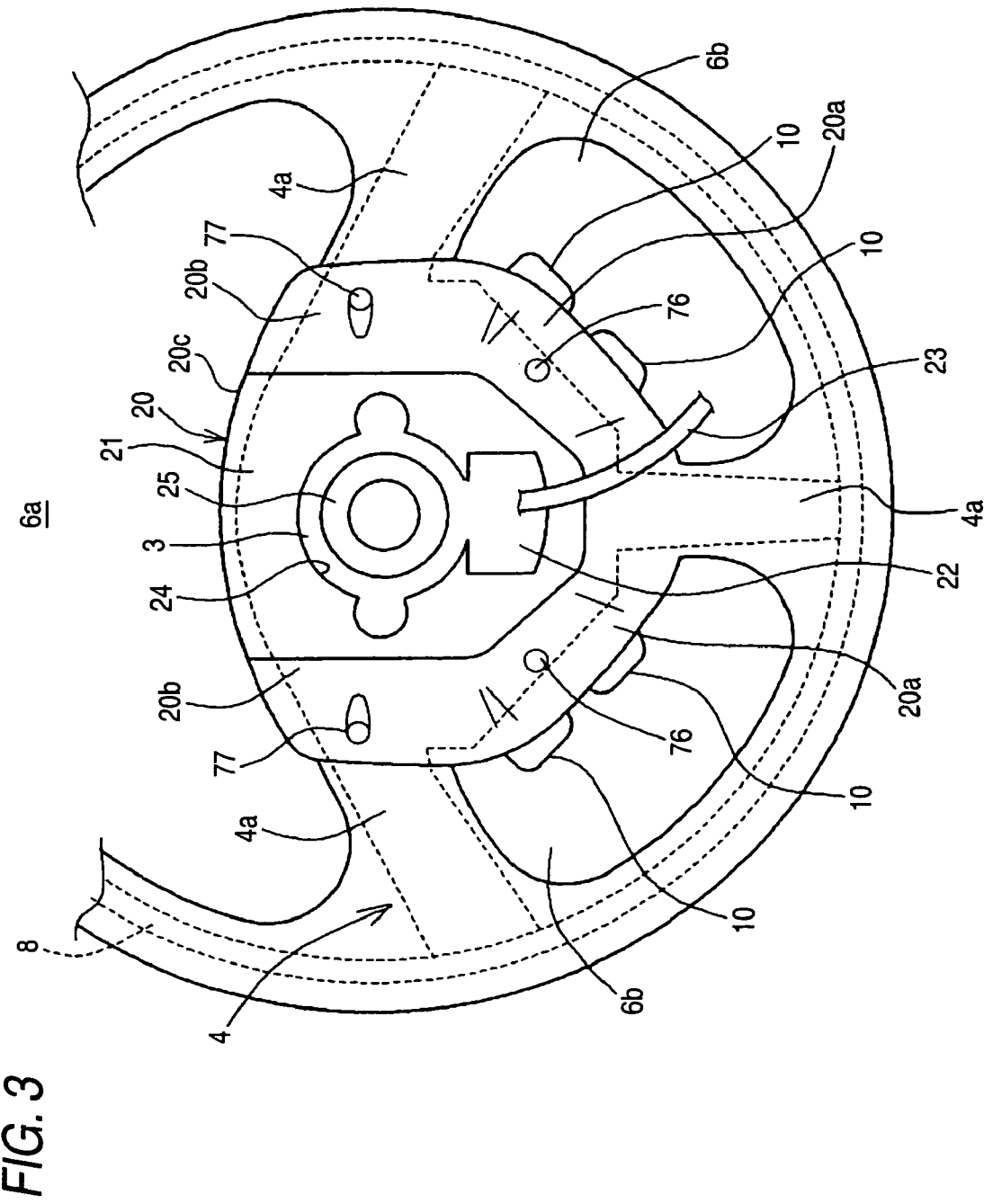
FIG. 3 is a rear view showing the steering wheel.

FIG. 3 is a view showing the rear face of the steering wheel 1. A central side of the rear face is also covered with a rear cover 20 up to the intermediate sections of the horizontal spoke 4a and the vertical spoke 4b in the radial direction. The rear cover 20 is formed into a nearly container-like shape, for example, by injection molding a synthetic resin.

The rear cover 20 has a nearly pentagonal shape similar to the center pad 5, and the paddle levers 10 protrude from the left and right lower walls 20a of the rear cover 20. An outer side portion of the vertical spoke 4b in the radial direction protrudes from a portion connecting left and right lower walls 20a of the rear cover 20. Outer side portions of the horizontal spoke 4a in the radial direction protrude from left and right side walls 20b of the rear cover 20. An upper side of the rear cover 20 is designated by 20c.

A through hole 22 is formed on a lower side of the bottom face 21 of the rear cover 20. A harness 23 connected to a cord 48 (see FIG. 6) is inserted into the through hole 22 so as to pass through the inside of the rear cover 20 and extend from the outside of the rear cover 20. A large-diameter hole 24 is provided at the center of the bottom face 21. A mounting shaft 25 on which the center boss 3 is installed is inserted into the large-diameter hole 24. The mounting shaft 25 protrudes toward the rear side and is connected to a steering shaft (not shown).

Figure 4:
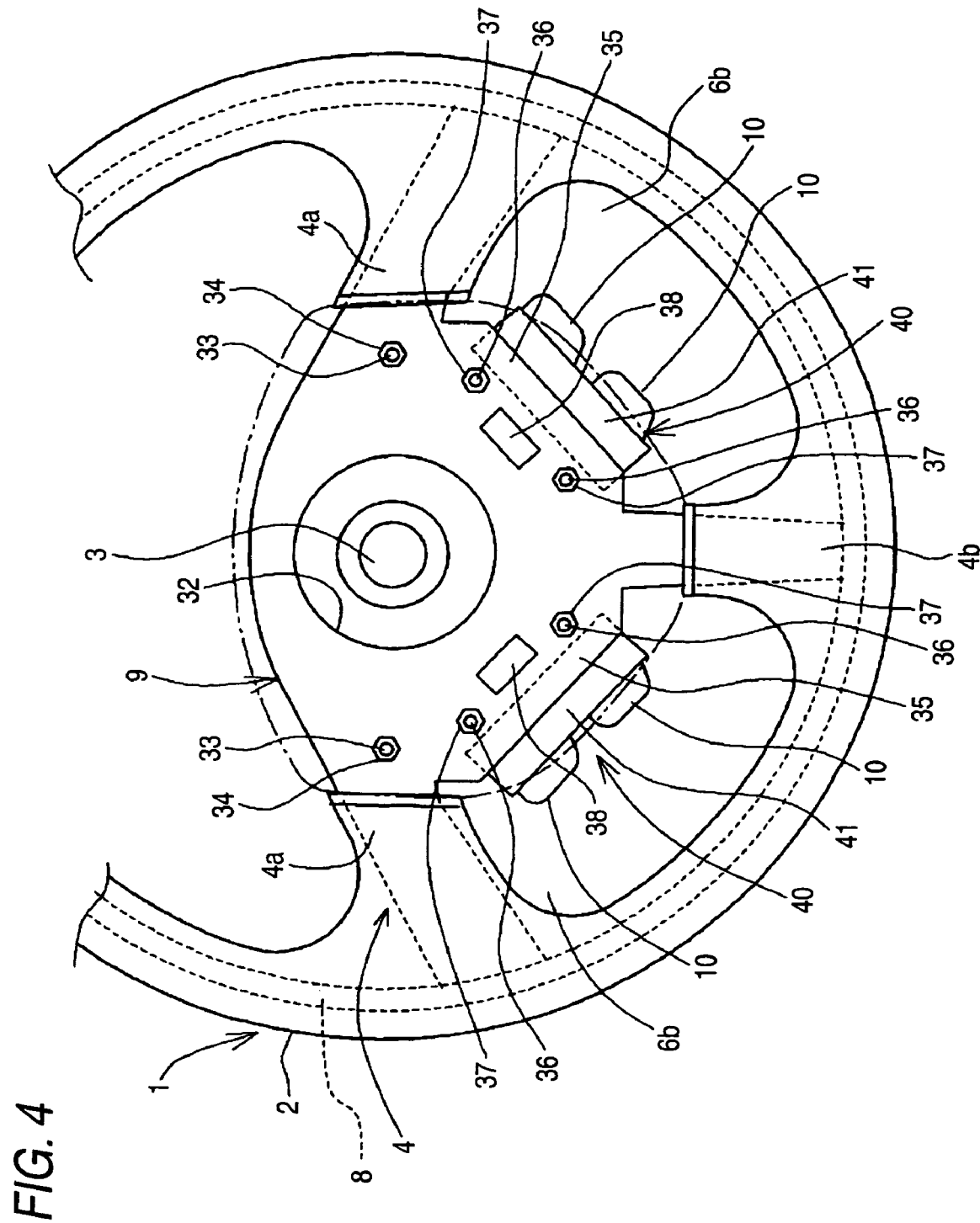
FIG. 4 is a front view showing the steering wheel without a center pad of the steering wheel.

FIG. 4 is a front view showing the steering wheel 1 without the center pad 5. Since the center pad 5 covers the central portion of the spoke section 4, the central portion is not covered with the outer skin 7 so that the spoke core metal sheet 9 is exposed. Extension sections 35 protruding into the left and right lower spaces 6b are provided on the lower side of the exposed portion of the spoke core metal sheet 9. Switch cases 41 of paddle switches 40 are installed on the extension sections 35 with screws 36 and nuts 37.

Rectangular through holes 38 are formed closer to the center of the steering wheel 1 than the switch cases 41 installed on the extension sections 35. Each rectangular trough hole 38 is formed between one pair of the screw 36 and the nut 37 and another pair of the screw 36 and the nut 37. Prismatic bosses described later are provided on the center pad 5 and pass through the rectangular trough holes 38.

Figure 5:
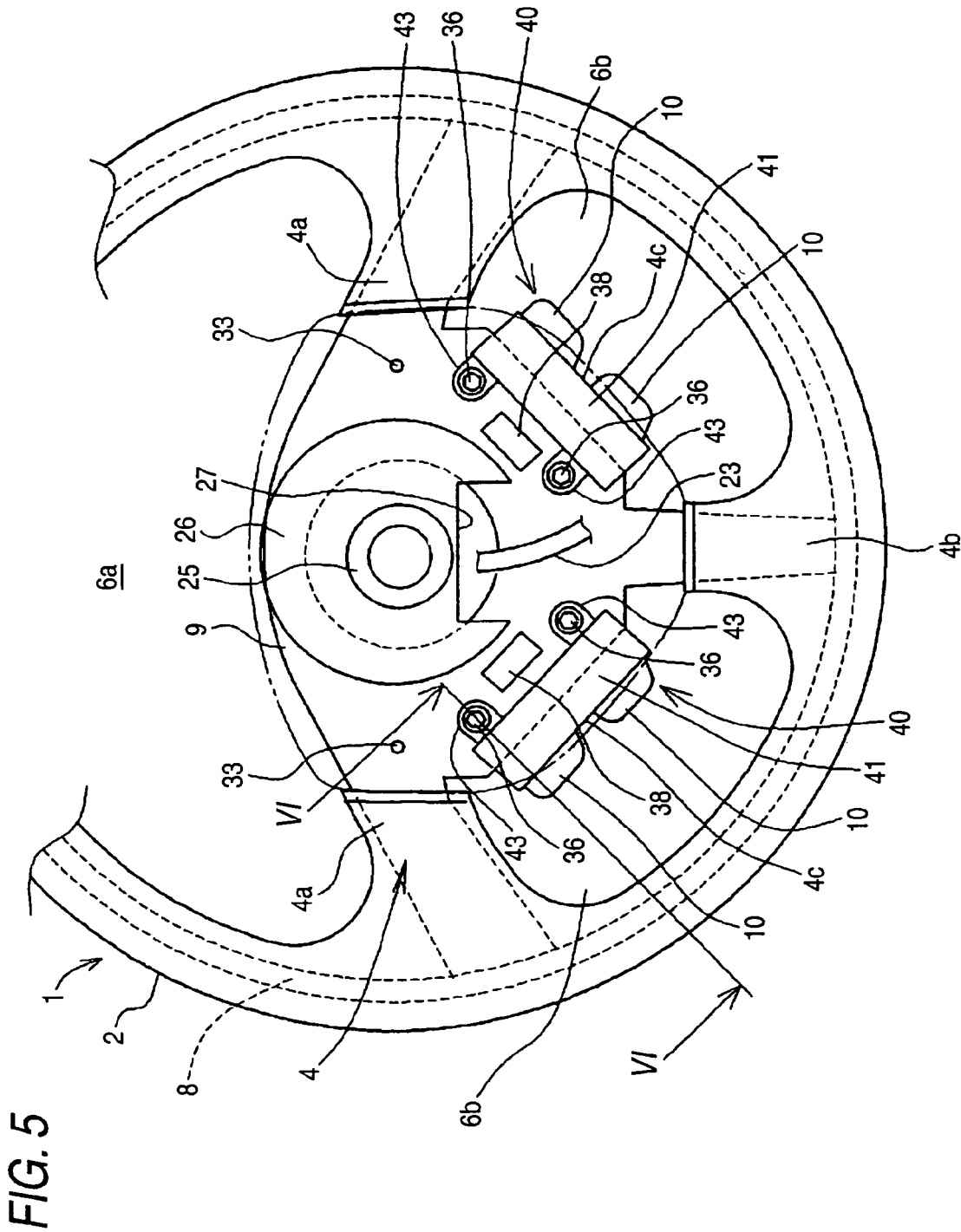
FIG. 5 is a rear view showing the steering wheel without a rear cover of the steering wheel.

FIG. 5 is a rear view showing the steering wheel 1 without the rear cover 20. A central portion of a rear face of the spoke section 4 is not covered with the outer skin 7 so that the spoke core metal sheet 9 is exposed. The central portion is covered with the rear cover 20. The center pad 5 and the rear cover 20 are used to cover the front and rear sides of the central portion of the spoke section 4, respectively.

A flange 26 is provided on the central rear face of the spoke section 4 via connecting fittings. The flange 26 composes the center boss 3 and installs the mounting shaft 25. The flange 26 has a circular cutout section 27. The harness 23 extends from the cutout section 27.

The switch case 41 of the paddle switch 40 is installed on the rear face of the extension section 35 with the screws 36 from the rear side. The paddle switch 40 is installed at a position protruding into the lower space 6b from the switch case 41. The lower space 6b is thus utilized effectively. The cord 48 (see FIG. 6) extends from the switch case 41 and is connected to the harness 23 inside the center boss 3.

Figure 6:
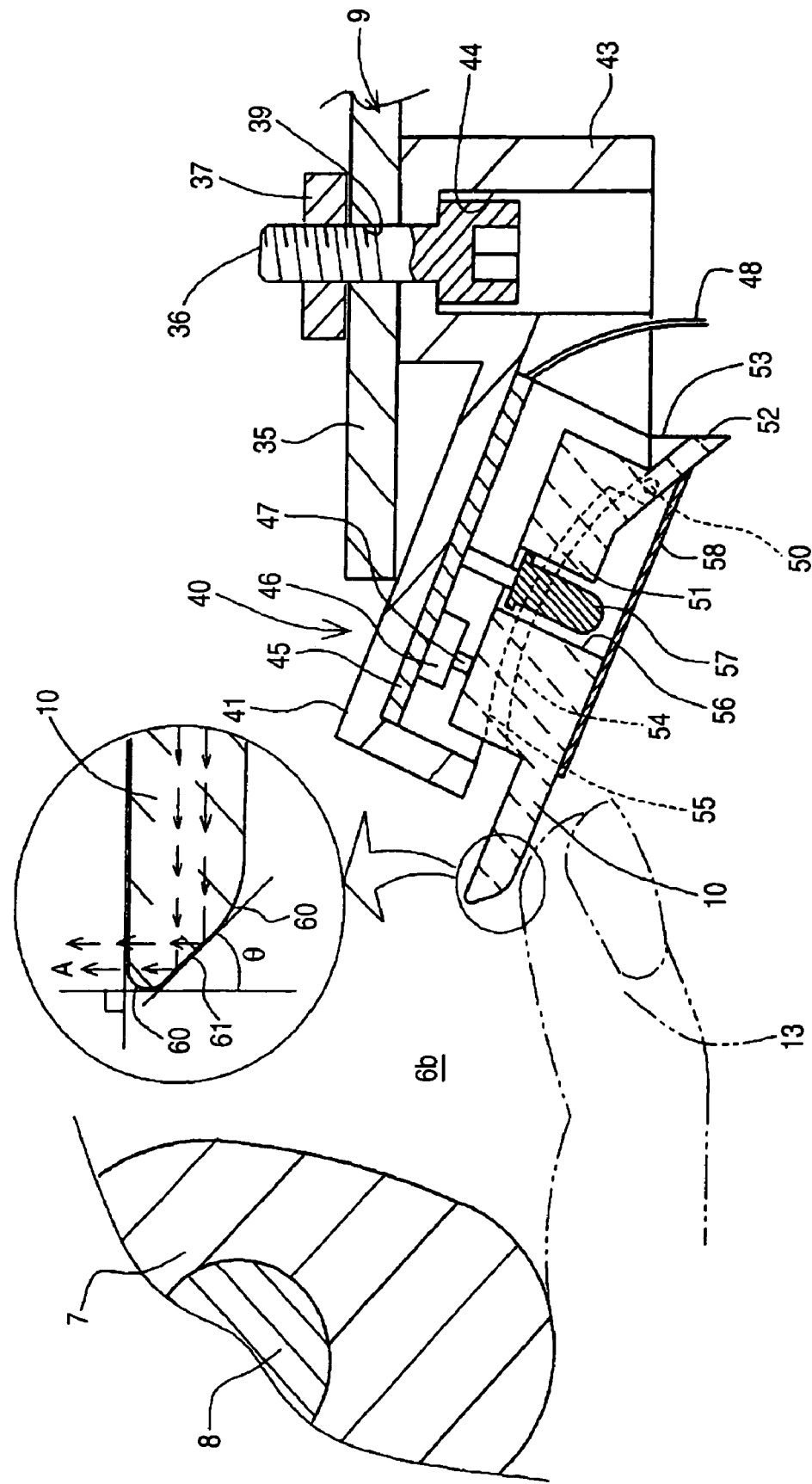
FIG. 6 is a sectional view taken on line 6-6 of FIG. 5.

FIG. 6 is a sectional view taken on line VI-VI of FIG. 5. Boss 43 formed so as to be integrated with the switch case 41 is disposed on the extension section 35. The screws 36 are passed through the through holes 44 provided in the boss 43 and through the through holes 39 provided in the extension section 35. Then, the boss 43 is fastened with the nuts 37 on the front side of the extension section 35.

A circuit board 45 is provided inside the switch case 41. A switch element 46 is mounted on the circuit board 45. The switch element 46 is a component obtained by sub-assembling the contact structure sections of the paddle switch 40 into a single small switch. An extensible rod 47 is urged by a spring toward the protruding direction from the switch element 46 to push the paddle lever 10. The circuit board 45 is disposed so as to incline as shown in FIG. 6. The cord 48 is connected to the circuit board 45.

When the paddle lever 10 is pulled up, the extensible rod 47 is pushed and the contact of the switch element 46 is switched ON, for example. Hence, a signal is sent to a controller (not shown) for controlling a corresponding apparatus via the circuit board 45 and the cord 48 to control the apparatus to turn it ON, for example. The control for lighting an LED 57 described later is also performed.

One end of a rocking plate 51 integrated with the paddle lever 10 is rockably installed in the switch case via a shaft 50. The other end of the rocking plate is contacted with the extensible rod 47 and is usually pushed by the extensible rod 47.

The rocking plate 51 is rockably supported on the side wall of the switch case 41 at a position close to the bosses 43 by the shaft 50. The shaft 50 is provided so as to pass through the switch case 41 or the rocking plate 51, or pass through both of the switch case 41 and the rocking plate 51.

A stopper protrusion 52 is provided on the rocking plate 51 in the proximity of the shaft 50, and is obliquely protruding. A stopper 53 is provided on the side of the switch case 41 so as to be corresponded to the stopper protrusion 52. When the rocking plate 51 rotates counterclockwise in FIG. 6, the stopper protrusion 52 contacts with the stopper 53, and the return distance of the stopper protrusion 52 is restricted to a predetermined amount.

An arc-shaped stepped section 54 is formed on the side face of the rocking plate 51. When the rocking plate 51 is pushed clockwise by a predetermined amount, the stepped section 54 of the rocking plate 51 makes contact with the opening fringe section 55 of the switch case 41, and the rocking plate 51 stops rotating after a predetermined amount of rotation. The opening fringe section 55 is formed into an arc shape corresponding to the shape of the stepped section 54.

The paddle lever 10 is wholly formed of a known transparent photoconductive material made of a resin. The paddle lever 10 is integrated with the rocking plate 51. A cutout groove 56 is formed in the paddle lever 10. The LED 57 is fitted in the cutout groove 56. The periphery of the LED 57 is densely covered with a light-shielding member 58 so that light does not leak around the LED 57.

The LED 57 is installed on the circuit board 45. The cord 48 is drawn out from the circuit board 45 and connected to the harness 23.

A tip end of the paddle lever 10 extends into the lower space 6b further than the switch case 41 and serves as an operation section that can be pushed with the index finger 13.

As shown in the enlarged view in FIG. 6, a fringe end face 61 provided with a chamfered section 60 is formed at the tip end of the paddle lever 10. The fringe end face 61 serves as a reflecting surface. The reflecting surface is inclined with respect to emitting direction of a light emitted from the LED 57.

Hence, the light emitted from the LED 57 passes through the inside of the paddle lever 10. The light is guided to the fringe end face 61 at the tip end. The light is reflected by the fringe end face 61, whereby the fringe end face 61 can be illuminated.

The fringe end face 61 is a slope face inclined to the central side of the steering wheel 1 toward the rear side, that is, a slope face inclined to the rear side, as viewed from the front face of the steering wheel 1. More specifically, the fringe end face 61 is a slope face inclined by angle θ with respect to line A orthogonal to the surface of the paddle lever 10. Furthermore, the slope face is inclined to the central side of the wheel section 2 such that the slope face is inclined toward the rear face as viewed from the front face.

Figure 7A:
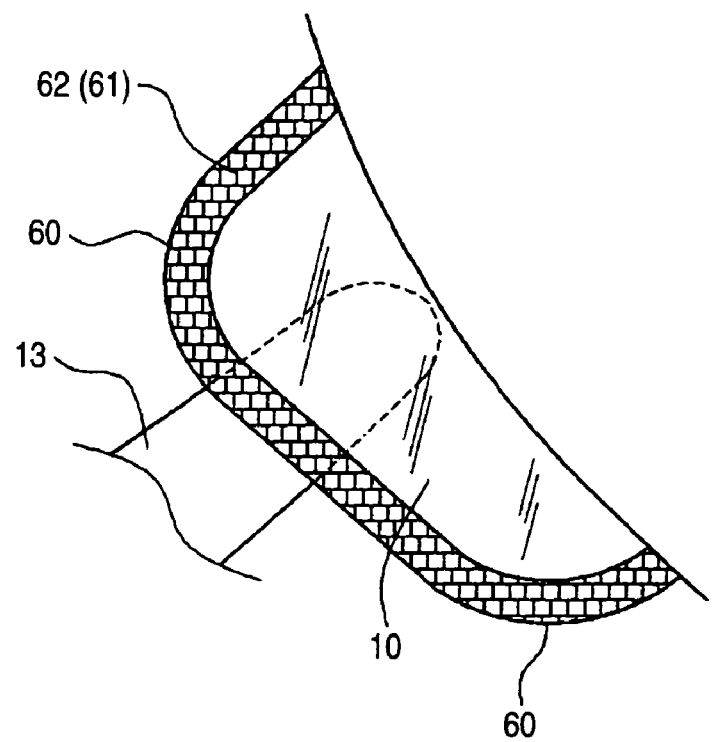
FIGS. 7A and 7B are views showing the illuminated border section of the paddle lever of the paddle switch.
Figure 7B:
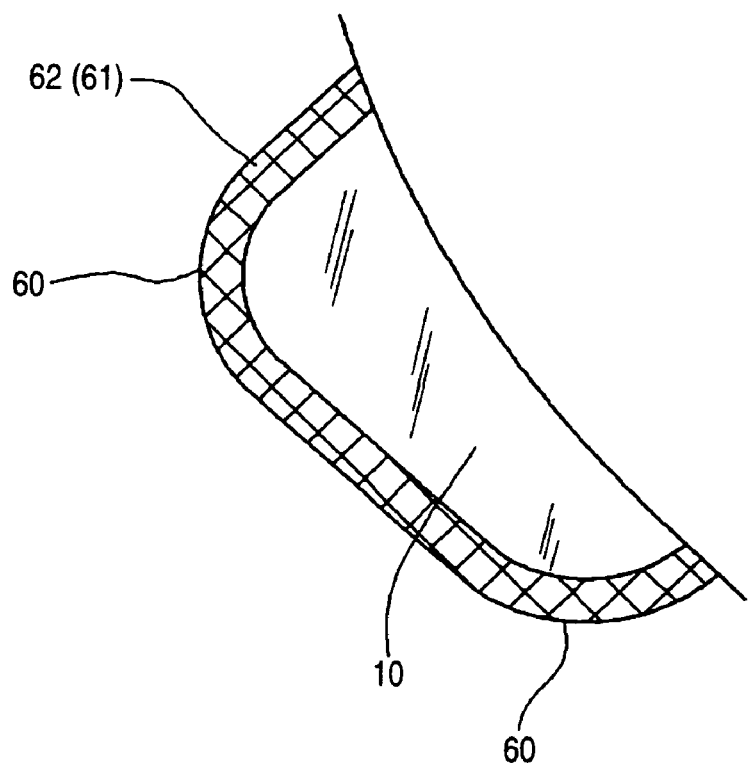

FIG. 7A is a view showing a state at the time when the paddle switch 40 is turned ON. FIG. 7B is a view showing a state at the time when the paddle switch 40 is turned OFF. As shown in FIGS. 7A and 7B, the slope face serves as a trimmed section 62 illuminated in a wide band shape on the fringe end face 61 around the periphery of the paddle lever 10. The fringe end face 61 is formed continuously around the paddle lever 10 on the three sides of the periphery of the paddle lever 10, excluding the side of the portion that is installed to the rocking plate 51. The illuminated trimmed section 62 is also formed continuously on the three sides.

The width of the illuminated trimmed section 62 can be adjusted to a wide or narrow dimension as desired by adjusting the inclined angle θ of the fringe end face 61.

Furthermore, as shown in FIGS. 7A and 7B, another chamfered section 60 is also formed at the corner section. Hence, the fringe end face 61 is not only formed to have the reflecting surface but is also formed into a smoothly curved shape at the edges around the periphery of the paddle lever 10. Therefore, operation can be performed smoothly so that the finger 13 is not caught by sharp edge-like portions around the periphery of the paddle lever 10.

The LED 57 is a multicolor LED that changes color depending on the control of voltage application direction. The luminescent color is changed by changing the voltage application direction depending on the ON/OFF operation of the paddle switch 40.

For example, when the LED 57 emits red light, the trimmed section 62 is illuminated in red.

For example, when the LED 57 emits blue light, the trimmed section 62 is illuminated in blue. However, the color obtained depending on the ON/OFF operation can be determined as desired. In addition, the light emission of the LED 57 while the paddle switch 40 is OFF can be synchronized with the lighting of the vehicle lights during driving at night or in other similar situations. That is, it may be possible that the LED 57 does not emit light when the vehicle lights are turned OFF and that the LED 57 emits light of the color determined for the OFF operation when the vehicle lights are turned ON.

Figure 8:
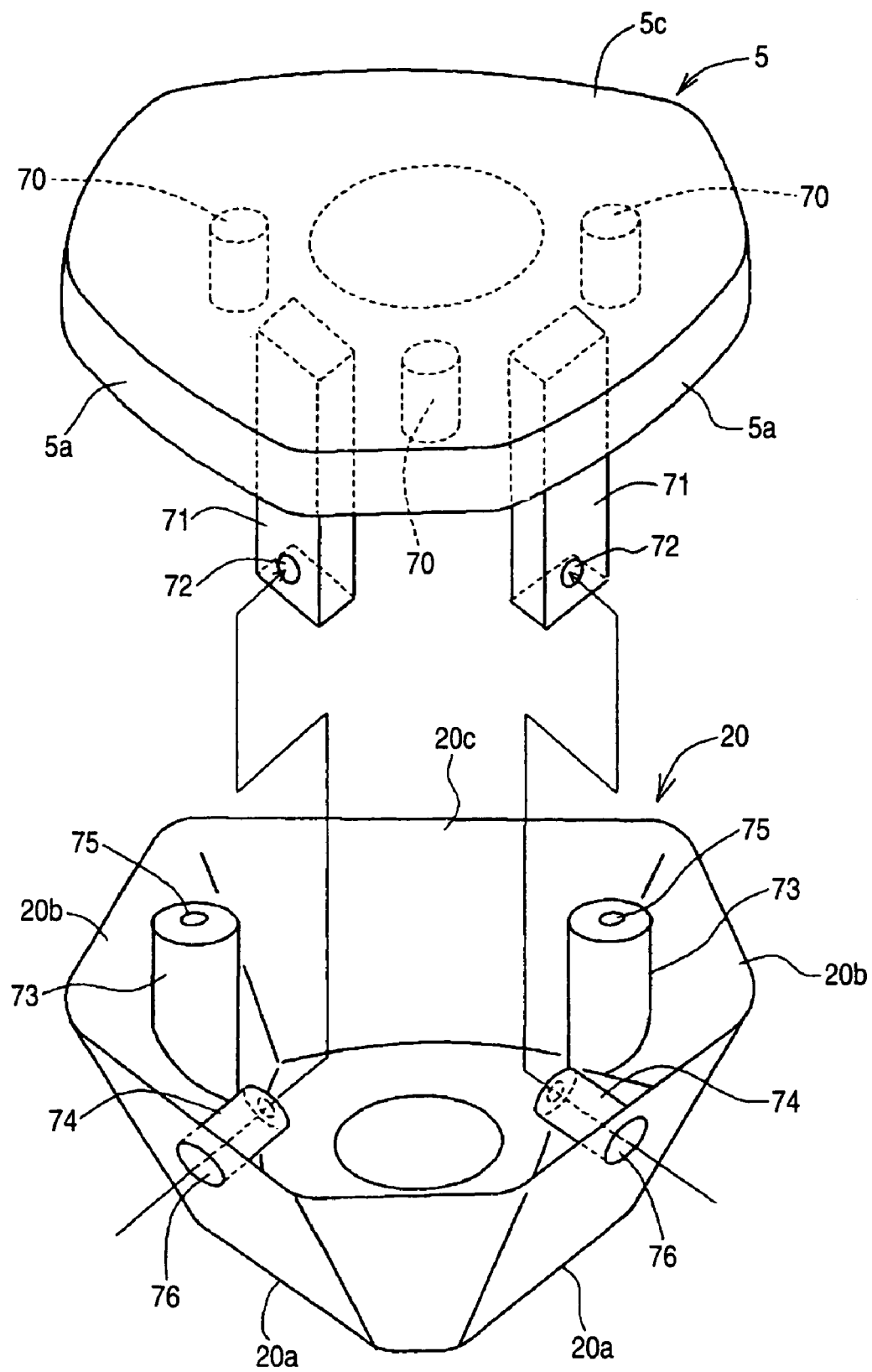
FIG. 8 is a schematic perspective view showing the center pad and the rear cover.

FIG. 8 is a schematic perspective view showing the center pad 5 and the rear cover 20. Cylindrical bosses 70 and prismatic bosses 71 protrude downward from the rear side of the center pad 5. The three cylindrical bosses 70 are provided around a portion corresponding to the location of the center boss 3. Lower faces of the cylindrical bosses 70 contacts with the surface of the central portion of the spoke core metal sheet 9 when the center pad 5 is installed (see FIG. 4).

The bosses 71, provided as a pair, are arranged to form a truncated V-shape while being separated from each other. The bosses 71 protrude downward further than the center pad 5. When the center pad 5 is installed on the spoke core metal sheet 9, the bosses 71 pass through the through holes 38 (see FIG. 4) and protrude below the spoke core metal sheet 9. Hence, the center pad 5 is positioned with respect to the spoke core metal sheet 9. The rear cover 20 is connected to the center pad 5 via horizontal through holes 72 provided at the lower end portions of the bosses 71 as described later.

The rear cover 20 expands upward and is open. A pair of cylindrical bosses 73 is provided upright inside the left and right walls 20b. In addition, horizontal cylindrical bosses 74 protrude inward from the left and right lower walls 20a. Each of The cylindrical bosses 73 and 74 has a screw through hole at the axial center section, and also has a smaller through hole 75 at the tip end section. A hole 76 of the horizontal bosses 74 is open in the lower wall 20a. A hole (refer to the hole 77 shown in FIG. 3) of the bosses 73 is open in the lower face of the rear cover 20.

When the rear cover 20 is laid over the rear face of the spoke core metal sheet 9, the tip ends of the bosses 73 contact with the rear face of the spoke core metal sheet 9. The through holes 75 are aligned with the through holes 33 provided in the spoke core metal sheet 9. Then, a screw is inserted into the hole 77 (see FIG. 3) being open in the lower face of the rear cover 20 through the axis portion of the boss 73 so as to pass through the through holes 75 and 33. The screw is fastened with the nut 34, whereby the rear cover 20 is installed on the spoke core metal sheet 9.

Furthermore, since lower end sections of the prismatic bosses 71 are positioned in the proximity of the tip ends of the horizontal bosses 74, the side faces of the lower end sections contact with the tip ends of the horizontal bosses 74. Hence, through holes formed at the tip ends of the horizontal bosses 74 are aligned with the through holes 72 formed in the bosses 71. Tapping screws (not shown) are each passed through the hole 76 and threaded into the through hole 72 to secure the center pad 5 with the rear cover 20. As a result, the rear cover 20 and the center pad 5 can be inserted on the spoke core metal sheet 9 by tightening only on the rear side of the steering wheel 1, that is, on the side of the rear cover 20.

Next, the operation of the embodiment will be described below. As shown in FIGS. 1, 6, 7A and 7B, one of the paddle levers 10 is touched and pulled up with the fingertip of the index finger 13 of the hand 11, when the rear face of the paddle lever 10 is touched with the fingertip of the index finger 13. Since the paddle levers 10 are transparent, it is possible to visually recognize instantaneously whether the target paddle lever 10 is selected from among the multiple paddle levers 10 and is touched with the fingertip of the index finger 13. Therefore, the movement of the line of sight is also done instantaneously.

At this time, the hand 11 grips the portion connecting the horizontal spoke 4a to the vertical spoke 4b on the lower half side of the wheel section 2. The paddle levers 10 are located within the reach of the index finger 13 while gripping the wheel section 2 with the hand 11. Hence, the paddle levers 10 can be operated by blind touch without changing grip positions.

In addition, the hand 11 can be positioned by gripping the base section between the horizontal spoke 4a and the wheel section 2 or the base section between the vertical spoke 4b and the wheel section 2 so that the hand 11 contacts with the horizontal spoke 4a or the vertical spoke 4b. Hence, the blind touch operation of the paddle levers 10 can be performed more accurately and easily.

Furthermore, since the paddle lever 10 is formed of a transparent photoconductor, the paddle lever 10 has simple structure, unlike a paddle lever of the related-art that has a composite structure formed of a photoconductor and a resin material other than that of the photoconductor or the like. Moreover, the photoconductors are each rimmed with the illuminated boarder section 62 so that the periphery of the photoconductor is illuminated in a rimmed shape. The paddle levers 10 are independent of each other at predetermined intervals. It is thus possible to visually recognize instantaneously whether the target paddle lever 10 is selected and to perform confirmation instantaneously when the paddle lever 10 is touched with the fingertip. Still further, even after the paddle lever 10 is touched with the fingertip, it is possible to visually recognize instantaneously and accurately that the fingertip of the index finger 13 is placed inside the illuminated border section 62. Hence, the movement of the line of sight during the operation of the paddle lever 10 is reduced and takes a very short time. It is thus possible to attain operation nearly equivalent to complete blind touch operation.

Each paddle lever 10 is made relatively large so that the area touched with the fingertip becomes large, so that the peripheral length of the illuminated border section 62 is made sufficiently long and so that the periphery is rimmed on the three sides. Hence, the target paddle lever 10 is identified easily and blind touch operation is done easily. Furthermore, since the fringe end face 61 is formed into a slope shape inclined rearward, the width of the illuminated border section 62 is made larger, and the light-emitting area can be increased. Hence, the paddle lever 10 can be visually recognized more easily.

Moreover, since the color of the illuminated border section 62 that lights depending on the ON/OFF operation of the paddle switch 40 is changed, the ON/OFF state of the paddle switch 40 can be judged accurately. It is thus not necessary to spend time and effort in checking the ON/OFF state of an apparatus to be operated each time the apparatus is operated. Therefore, the operation can be performed promptly.

Besides, since the paddle switches 40 are provided on the lower half side of the steering wheel 1, the paddle switches 40 are positioned against the background of the instrument panel of an ordinary vehicle, and the illuminated border sections 62 of the paddle switches 40 are also disposed against the background of the instrument panel. Hence, the border sections 62 do not interfere with driving, and are visually recognized properly at any time during the day or night.

The present invention is not limited to the embodiment described above but can be modified and applied variously within the principle of the invention. For example, the apparatuses to be turned ON/OFF for example using the paddle switches 40 may be any apparatuses. For example, among the paddle switches provided on the left and right sides of the vertical spoke 4b, the paddle switch on the left side can be used for hands-free communication. One of the paddle levers 10 can be used for turning ON/OFF a communication device and another paddle lever 10 (operation knob) can be used for speech switching.

Furthermore, the paddle switch on the right side can be used to support driving and may be used for auto-cruising, shift up and shift down, for example.

Any number of the paddle levers (operation knobs) can be used. It is desirable that the paddle levers should be made as large as possible to facilitate blind touch operation. In addition, it is also desirable that a sufficient clearance should be provided between the adjacent paddle levers 10 so that the paddle levers 10 can be operated independently of each other for higher operability.

Furthermore, any number of the spoke sections 4 and any shape the spoke sections 4 of can be used in the steering wheel 1 to which the present invention is applied. A steering wheel provided with only the horizontal spoke 4a and not provided with the vertical spoke 4b and a steering wheel provided with one spoke may also be used. The point being that it is sufficient provided that the paddle switches 40 can be disposed on the lower half side of the steering wheel 1.

What is claimed is:

1. A paddle switch for a steering wheel, the paddle switch protruding from a lower portion of a center pad provided on a center of the steering wheel, comprising:
a first operation knob which is pulled up with a fingertip of a driver toward the driver so as to be turned ON/OFF, in which an entire body of the first operation knob is formed of a transparent photoconductor for visually recognizing instantaneously whether the first operation knob is touched with the fingertip, wherein
an outer periphery of the first operation knob is illuminated depending on an ON/OFF operation of the paddle switch, and
only a band-shaped portion formed continuously around the first operation knob on three sides of the outer periphery of the first operation knob is illuminated depending on the ON/OFF operation of the paddle switch.

2. A paddle switch for a steering wheel, the paddle switch protruding from a lower portion of a center pad provided on a center of the steering wheel, comprising:
- a first operation knob which is pulled up with a fingertip of a driver toward the driver so as to be turned ON/OFF, in which an entire body of the first operation knob is formed of a transparent photoconductor for visually recognizing instantaneously whether the first operation knob is touched with the fingertip, wherein
- an outer periphery of the first operation knob is illuminated depending on an ON/OFF operation of the paddle switch, and
- the outer periphery of the first operation knob is rimmed with a boarder section so that the outer periphery is illuminated in a rimmed shape.

3. The paddle switch according to claim 2, wherein
a reflecting surface is formed on an operation part of the outer periphery of the first operation knob.

4. The paddle switch according to claim 2, wherein
the operation part of the outer periphery of the first operation knob is chamfered.

5. The paddle switch according to claim 3, wherein
the reflecting surface of the first operation knob is inclined with respect to emitting direction of a light from a light source.

6. The paddle switch according to claim 2, wherein
a light source is a multicolor LED, and
the outer periphery of the first operation knob is illuminated with different colors depending on the ON/OFF operation of the paddle switch.

7. A steering wheel comprising:
a paddle switch according to claim 2;
a wheel section;
a center pad provided on a center of the steering wheel; and
a horizontal spoke extending from the center pad in a radial direction, wherein
the paddle switch is installed in the center pad,
the first operation knob of the paddle switch protrudes toward a lower space formed between the horizontal spoke and the wheel section and is positioned within the reach of a finger in state of gripping a lower half side of the wheel section with a hand.

8. The paddle switch according to claim 2, further comprising:
a second operation knob provided next to the first operation knob, wherein
a certain clearance is provided between the first and second operation knobs so as to be operated independently with respect to each other.

* * * * *